United States Patent

[11] 3,628,434

[72] Inventors Ludwig Leitz;
 Willy Franke, both of Wetzlar, Germany
[21] Appl. No. 821,329
[22] Filed May 2, 1969
[45] Patented Dec. 21, 1971
[73] Assignee Ernst Leitz GmbH
 Wetzlar, Germany
[32] Priority May 9, 1968
[33] Germany
[31] P 17 72 399.8

[54] FOCAL-PLANE SHUTTER FOR PHOTOGRAPHIC CAMERA
 8 Claims, 5 Drawing Figs.
[52] U.S. Cl. .................................................... 95/55
[51] Int. Cl. ...................................................... G03b 9/36
[50] Field of Search ........................................... 95/55

[56] References Cited
 UNITED STATES PATENTS
2,950,665 8/1960 Meixner ........................ 95/55
3,023,685 3/1962 Meixner ........................ 95/55
3,228,315 1/1966 Platt ............................. 95/55
3,513,763 5/1970 Singer ........................... 95/55
1,231,878 7/1917 Grenell.......................... 95/55 X Primary Examiner—Samuel S. Matthews
Assistant Examiner—Michael L. Gellner
Attorney—Krafft & Wells ABSTRACT: The leading and the lagging shutter blade of a focal-plane shutter are both provided with a racklike row of teeth at the outer edges of each blade and extending in parallel to the direction of shutter-blade movement. The blades move in the direction of the short side of the image aperture in the image-aperture plate, and toothed segments are arranged in the camera between the cone of light, travelling from the camera lens to the film through the image aperture and the adjacent partition walls of the camera housing; the segments being permanently in mesh with the racks of the blades and being used either for driving the shutter blades after shutter release and for returning them to their starting position or only for the latter purpose.

FOCAL-PLANE SHUTTER FOR PHOTOGRAPHIC CAMERA

CROSS-REFERENCE TO RELATED APPLICATIONS

Applicants claim priority under 35 USC 119 for application P 17 72 399.8 filed May 9, 1968 in the Patent Office of the Federal Republic of Germany.

BACKGROUND OF THE INVENTION

The present invention relates to focal-plane shutters having a leading and a lagging shutter blade which travel independently from one another.

To those skilled in this particular art, focal-plane shutters are well known wherein both the leading and the lagging shutter blade consist of a plurality of smaller lamellae. When a blade covers the aperture in the image-aperture plate the lamellae, usually two or three, are arranged side-by-side, however, overlapping each other along a small edge, while in the other end position of the blade the lamellae fold so as to cover one another, thus saving valuable space inside of the camera.

In order to make the shutter-moving time as short as possible it is also well known to displace the shutter blades in the direction of the short side of the image frame.

Usually the drive means and tensioning means of the shutter blades require considerable space which is not available if the camera is to be a small size one. It is therefore an object of the invention to provide a novel type of shutter-drive means or shutter-tensioning means respectively which are arranged on either side of the image aperture in the camera.

On the other hand, the required small size of the camera demands the film cartridge and the takeup spool being positioned as close as possible to the image aperture in lateral direction. If, now, the shutter-drive means are to be disposed on either side of the image aperture they must be arranged between the cone of light that travels from the camera lens to the film and the partition walls which separate the space behind the lens from the cartridge compartment and the takeup spool compartment. It becomes thus apparent that the drive and tensioning means can only be designed very flat.

Drive and tensioning means of such nature are already known in the art, for example by the Japanese Utility Model Publication 31-12858. These means comprise a bar linkage arranged on either side of the image aperture and by which the shutter blades (each comprising two lamellae) are displaced in front of the image aperture in the manner of lazy tongs. However, it is a disadvantage of this prior art drive means that the driving bar of each linkage is rather short, as a consequence of which unfavorable leverage the power transmission is also very unfavorable. The main disadvantage however being that the linkage exerts a pressure on the guide ways of the lamellae, thus causing increased friction thereon.

It is therefore another object of the invention to provide drive and tensioning means which do not cause additional friction at the lamellae guide means.

SUMMARY OF THE INVENTION

The above-stated objects are attained by providing a racklike row of teeth along the outer edges of each shutter blade and, further, by providing a toothed segment on either side of the image aperture between the light cone and an adjacent partition wall. Each segment meshes constantly with the teeth of one blade and is pivotable about an axis which extends in parallel to the direction of film advancement.

The invented toothed segments exert no pressure on the shutter blades, thus avoiding the above-stated disadvantage of the prior art design.

Further, the frictional forces are generally reduced by guiding the shutter blades on guide bars by means of relatively loose forked-blade portions.

In the event of each shutter blade comprising two or more lamellae, as is already known in the art, i.e., one main lamella with the slot-forming edge and further auxiliary lamellae which only serve the purpose of completely covering the image aperture, it is, further, suggested to guide all lamellae of one blade on one guide bar which extends in parallel to the short side of the image frame and to provide U-shaped tabs on each lamella which are positioned on the guide bar in an overlapping manner.

Also it is suggested to provide the racklike row of teeth only on the main lamella and to drive the auxiliary lamellae, for example, by abutment of the U-shaped tabs of the main lamella against those of the first auxiliary lamella, and so on. However, the auxiliary lamellae can also be propelled by separate springs, or at least such springs can be arranged to support the driving effect of the main lamella on the auxiliary lamellae.

The toothed segments are driven by rocking cranks which are linked to the toothed segments by means of connection rods. The cranks rock under the effect of springs and are provided with detent pins which are retained by pawls. The latter being releasable in known manner by the shutter-release knob or by an exposure time-setting device.

In the event of the toothed segments being merely used for shutter tensioning, the shutter blades can be driven by other suitable means, for example, by helical springs which are in driving connection with the main lamella and which are disposed around the guide bar of the lamellae. The auxiliary lamellae can in this case be driven in the same manner as described above; either by the main lamella by means of an abutting engagement of the tabs or by separate springs.

The toothed segments which in such an embodiment of the invention are only used for the shutter-tensioning operation are in mesh with the racklike teeth also during shutter release and thus take part in the shutter-blade motion in an idle rotation.

DESCRIPTION OF THE DRAWINGS

Further features and advantages of the invention will become apparent from the following description when taken in conjunction with the appending drawings wherein an embodiment of the invention is illustrated in which the toothed segments are used for driving the shutter blades after shutter release and also for moving the shutter blades back to their starting position. In the drawings.

DESCRIPTION OF THE PREFERRED EMBODIMENTS

Figure 1:
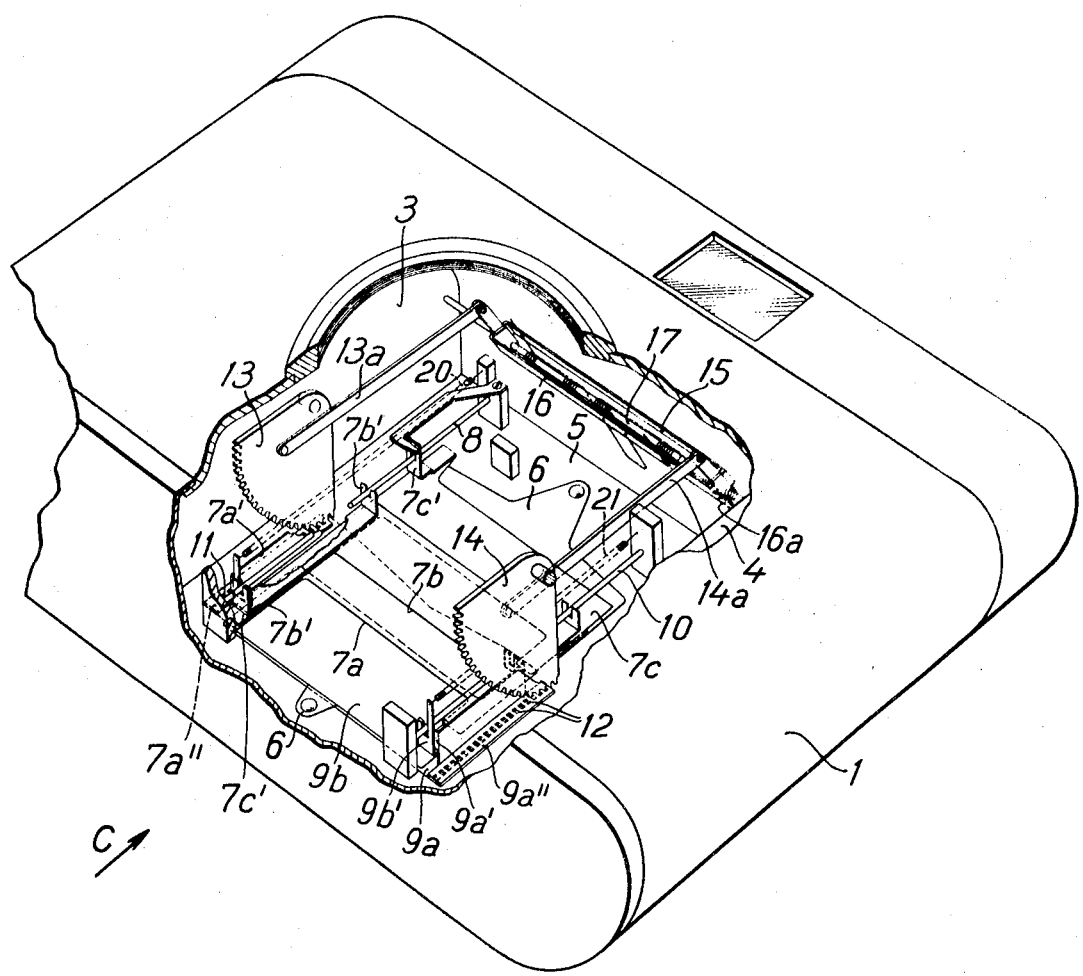
FIG. 1 is a perspective, partially cut front view of a photographic camera wherein the invented shutter is incorporated, the lens being removed.
Figure 2:
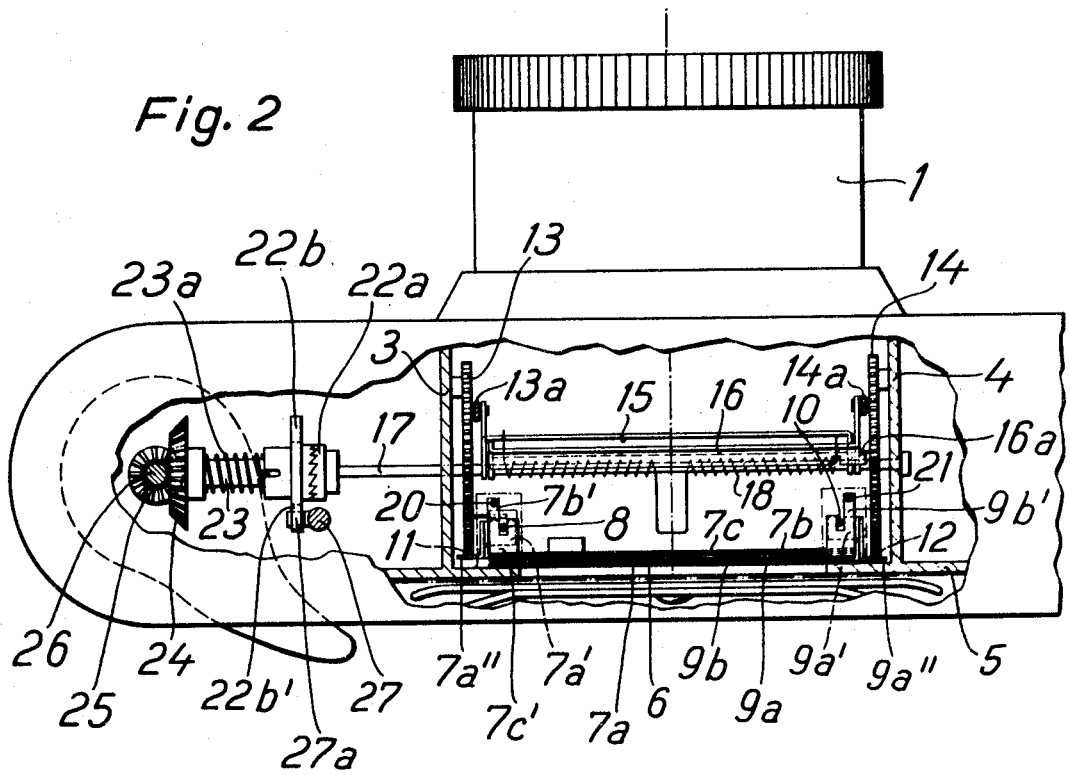
FIG. 2 is a view of the camera in the direction of arrow C in FIG. 1.

Referring now to the drawings, in the camera housing 1 there are along the outer sides provided compartments adapted to house the film cartridge and the takeup spool respectively. The compartments are separated from the interior of the camera by two partition walls 3, 4 (FIG. 1) and are connected by an image-aperture plate 5. The film (not shown) is arranged behind the image-aperture plate, and in front of the plate the shutter is located. During an exposure the shutter blades travel upward, i.e., in a direction from the bottom of the camera towards the cover plate.

Figure 3:
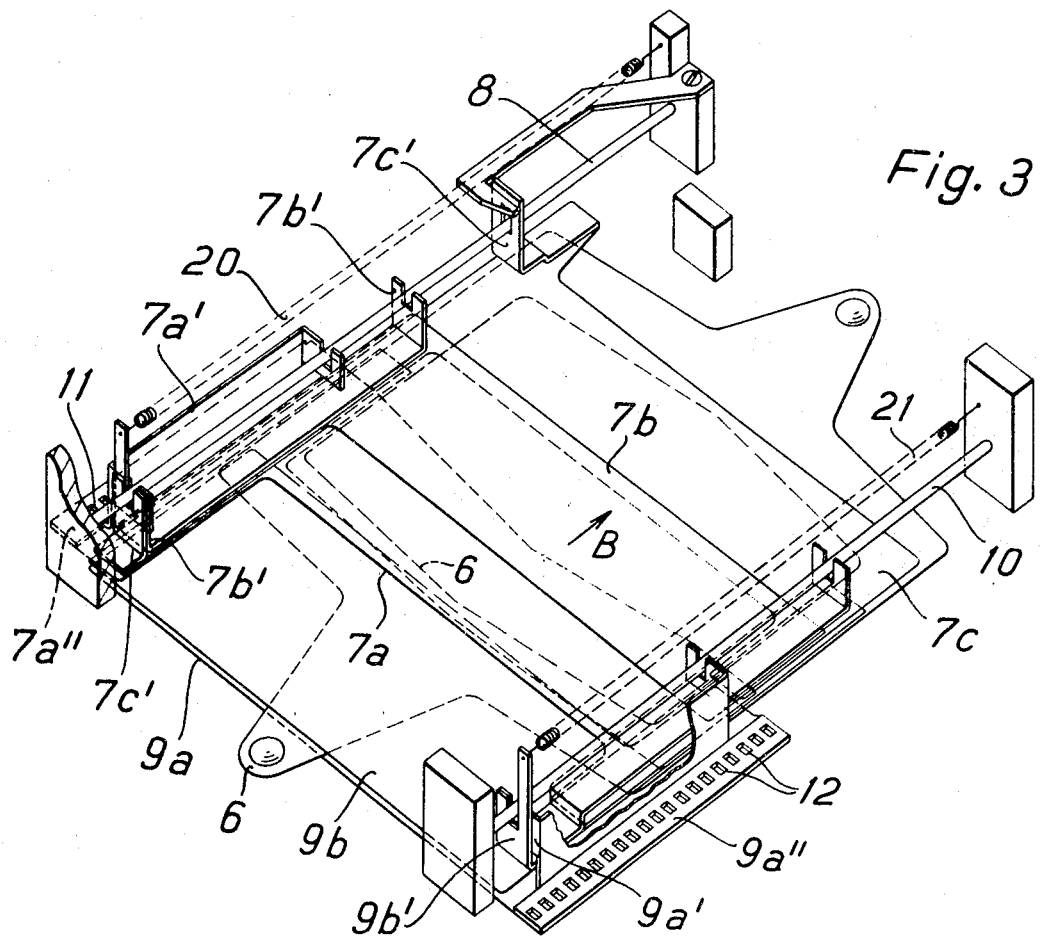
FIG. 3 is a perspective view of the tensioned shutter on an enlarged scale.
Figure 4:
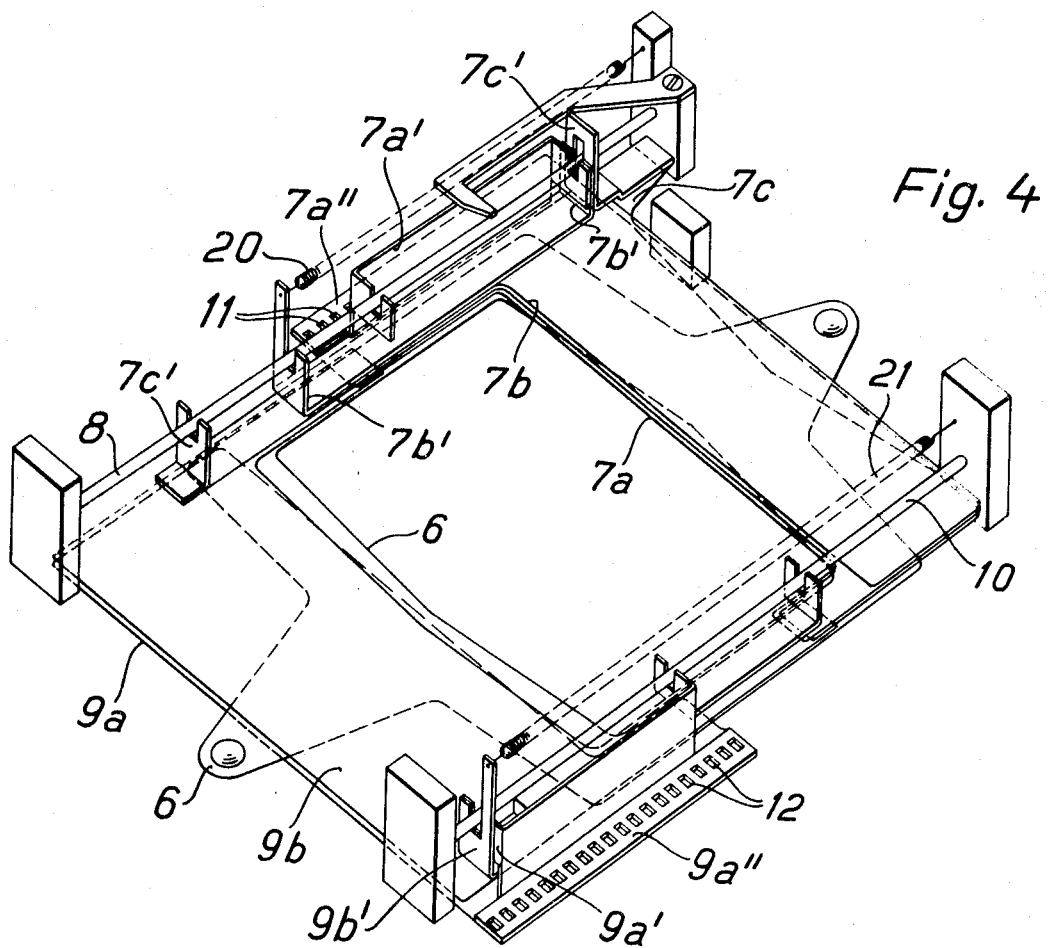
FIG. 4 is a view similar to FIG. 3, however with the image aperture open.

The various elements of the shutter are best discernible from FIGS. 3 and 4. FIG. 3 shows the shutter tensioned in which state the leading shutter blade covers the image aperture with its three lamellae 7a, 7b, 7c with lamella 7a being the slit-forming main lamella. All these lamellae are on the left side (in the drawing) provided with bent-over portions which form the tabs 7a', 7b', 7c' respectively. The tab ends are forked and by these forked ends the lamellae are guided on a guide bar 8. The tabs are arranged on the guide bar in an overlapping manner so that the lamellae will fold telescopelike when the shutter blade is released and moves in the direction of arrow B.

The lagging shutter blade comprises only two lamellae, the main lamella 9a and the auxiliary lamella 9b. In FIG. 3 these lamellae are positioned below the image aperture 6, one on top of the other. They are also provided with tabs 9a' and 9b' by the forked ends of which they are guided on a guide bar 10.

Both shutter blades are driven by means of the main lamellae 7a, 9a which are further provided with projecting edges 7a'', 9a'', each having a row of holes so as to form a perforation which in effect constitutes a toothed rack 11, 12.

With the racks are two-toothed segments 13, 14 in mesh which are pivotably secured to the partition walls 3, 4 (FIG. 1) and connection rods 13a, 14a link each segment to a rocking crank 15 and 16. The rocking cranks have also bent-over ends so as to form U-shaped bows which are pivotably hinged on a shaft 17 underneath the camera cover plate. A spring 18, which from its middle is wound in opposite directions, is also positioned on shaft 17 and provides the motive force for the rocking cranks 15 and 16 (FIGS. 1 and 5).

From the foregoing description and the drawings it will be comprehended that the lamellae are driven in one direction only, with only the main lamellae 7a, 9a being driven by the toothed segments 13, 14. The remaining auxiliary lamellae are driven by the tabs of the main lamellae abutting against those of the next auxiliary lamellae and so on. However, displacement of the lamella next to the main lamella is also supported by a spring. To this end, a spring 20 is suspended between the upper wall of the camera housing and one end of the tab 7b', while another spring 21 is suspended between this upper camera wall and one end of tab 9b'.

On the side opposite to the one wherein the toothed rack is provided the edges of the lamellae are guided in suitably shaped slots which are not shown in the drawings for sake of simplicity.

Figure 5:
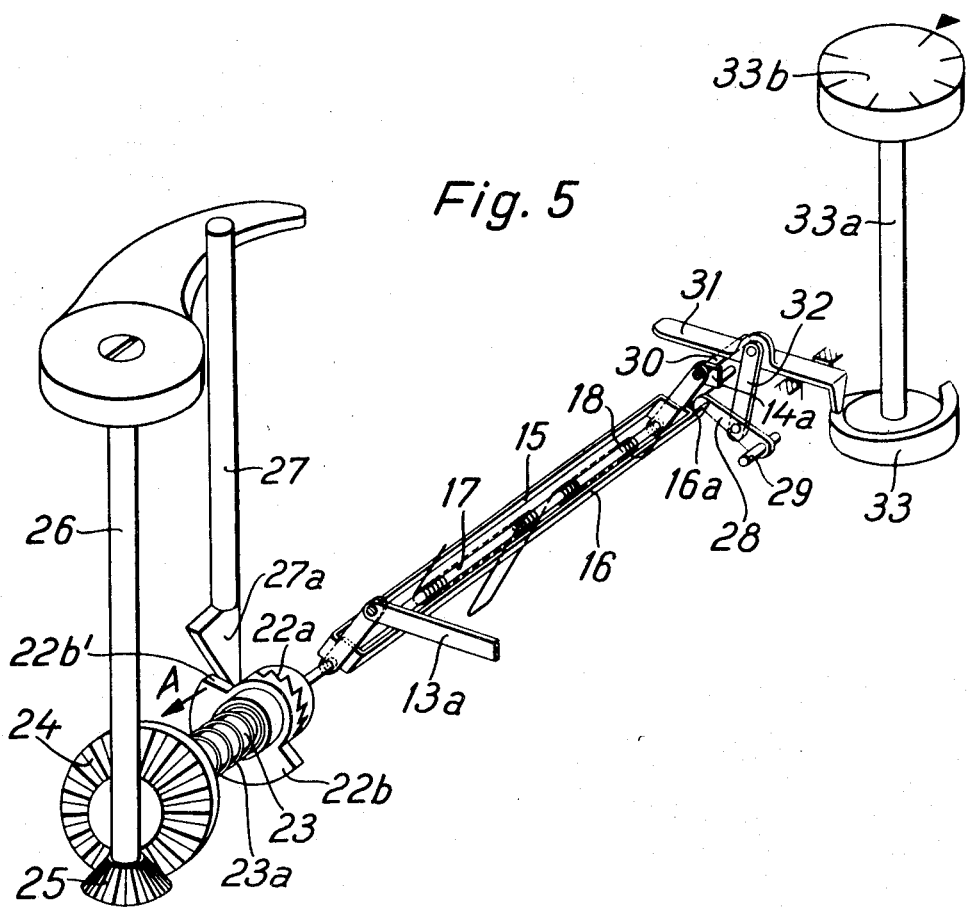
FIG. 5 is a perspective view of the shutter tensioning and release means.

The shutter-tensioning means and the shutter-release means are illustrated best in FIG. 5. Rocking crank 15 which is linked to the toothed segment 13 by means to the the connection rod 13a is rigidly mounted on shaft 17. One end of shaft 17 carries in rigid connection the toothed disc 22a of a clutch the other disc 22b of which being laterally displaceable in a tongue-and-groove guidance (not shown) on a shaft 23 in the direction of arrow A against the force of a spring 23a. Further, a bevel gear 24 is rigidly mounted on shaft 23, which bevel gear is constantly in mesh with a second bevel gear 25 on tensioning shaft 26.

Shutter release is performed by pressing a shutter release bar 27 which has a wedgelike portion 27a at its lower end thereby acting on a shoulder 22b' of disc 22b. This arrangement constitutes the locking means of the leading shutter blade.

The lagging shutter blade is retained by a pawl 28 which engages a tab 16a of rocking crank 16 and which is pivotable about a stationary pin 29. Pawl 28 is released from engagement with tab 16a by crank 15 when the latter rocks into its shutter-released position. To this end, the latter is provided with a pin 30 which acts upon one end of a pivotable two-armed lever 31. Lever 31 is linked to pawl 28 by means of an intermediary bar 32 and rests with its second arm on a time-setting cam 33, the latter being connected to a shaft 33a and a time-setting knob 33b. When knob 33b is turned, cam 33 causes lever 31 to be more or less pivoted whereby it reaches more or less in the path of travel of pin 30. As a consequence thereof pin 30 will lift pawl 28 from engagement with tab 16a at the end of a longer or shorter period of time after release of the leading shutter blade, thus releasing the lagging shutter blade.

The above-described shutter functions as follows:

First, the desired exposure time is set by turning knob 33b in the tensioned state of the shutter. Lever 31 is thereby pivoted accordingly. Next the shutter-release bar 27 is pressed which causes the wedgelike portion 27a to displace disc 22b in the direction of arrow A against the force exerted by spring 23a, thereby uncoupling the two clutch discs 22a, 22b from one another. This sets shaft 17 free to rotate under the influence of one end of spring 18, whereby shaft 17 pivots crank 15 which is rigidly mounted thereon. Via connection rod 13a crank 15 drives thus the toothed segment 13 in a counterclockwise direction (FIG. 3).

By means of its teeth segment 13 drives the main lamellae 7a of the leading shutter blade in the direction towards the upper camera wall. The next (auxiliary) lamella 7b follows this movement immediately on account of spring 20, however, it is also pushed by the upper tab 7a', when the latter abuts against the upper tab 7b'. Both lamellae move then together upwards with lamella 7c, which moves freely on guide bar 8, remaining stationary for the time being. Only when the upper tab 7b' of auxiliary lamella 7b abuts against tab 7c' lamella 7c will also be pushed upwards. At the end of this lamellae displacement the image aperture 6 will be completely uncovered.

In the meantime, however, pin 30 has already hit on lever 31 and lifted it to an extent which causes pawl 28 to become disengaged from tab 16a. Crank 16 therefore follows crank 15 driven by the resilient force of the second end of spring 18. Consequently, connection rod 14a now pivots the toothed segment 14 which drives the main lamella 9a of the lagging shutter blade and causes it to follow the leading shutter blade. In this manner a slot for the exposure of the film is defined between the two main lamellae 7a, 9a.

The next (auxiliary) lamella 9b of the lagging shutter blade follows the main lamella 9a under the influence of spring 21. At the end of the exposure both lamellae will cover the image aperture 6.

Shutter tensioning is performed by turning shaft 26 by means of a winding lever. The bevel gears 24, 25 rotate shaft 23 together with disc 22b and the latter rotates, in turn, disc 22a with shaft 17. Thereby crank 15, rigidly mounted on shaft 17, is returned to its initial position which during this return motion also pushes crank 16 back since the arm of crank 15 which carries pin 30 abuts against a portion of crank 16 (FIG. 5).

During this return motion pin 30 lifts again lever 31 and passes underneath as a consequence whereof, pawl 28 can again engage tab 16a at the end of the return motion, thus again locking the lagging shutter blade, while the leading shutter blade is locked by the friction of the tensioning shaft 26 and the gearing 24, 25. The camera is now ready for another shutter release.

What is claimed is:

1. A focal-plane shutter for photographic cameras comprising, in combination, a leading shutter blade and a lagging shutter blade, each said shutter blade consisting of a main lamella and a plurality of auxiliary lamellae, said lamellae being displaceable in the direction of one side of the image aperture in the image-aperture plate, each said main lamella having a racklike row of teeth along an edge thereof, the row of teeth on the leading main lamella extending parallel to one edge of the image-aperture plate and the row of teeth on the lagging main lamella extending parallel to the opposite edge of said aperture, a first toothed segment mounted on an inner camera wall adjacent the row of teeth of the leading main lamella and a second toothed segment mounted on an inner camera wall adjacent the row of teeth of the lagging main lamella, the teeth of said segments permanently meshing with said racklike row of teeth on the associated lamella, means adapted to pivot said segments, one after the other, in a preestablished temporal relationship, said means adapted to pivot comprising two spring-driven rocking cranks, each said crank being connected to one of said toothed segments by means of a connection rod, tabs on said main lamellae adapted to drive said auxiliary lamellae in an abutting engagement after said main lamellae have travelled through a preestablished distance, and means adapted to return said segments and said shutter blades to their initial position.

2. A focal-plane shutter for photographic cameras as claimed in claim 1, wherein said racklike row of teeth is a perforation row cut out along one edge of said main lamellae.

3. A focal-plane shutter for photographic cameras as claimed in claim 1 and further comprising spring means adapted to drive said auxiliary lamellae immediately after shutter release and to support driving of said auxiliary lamellae by said main lamella after abutment of said tabs of said main lamella against said tabs of said auxiliary lamellae.

4. A focal-plane shutter for photographic cameras as claimed in claim 3, wherein said spring means are helical springs which are supported by said guide bars.

5. A focal-plane shutter for photographic cameras as claimed in claim 1, wherein said cranks comprise abutting means adapted to limit said rocking motion and to establish an abutting engagement between said cranks during the shutter-tensioning motion.

6. A focal-plane shutter for photographic cameras as claimed in claim 1, and further comprising locking means on said crank which drives the toothed segment associated to the lagging shutter blade, said locking means being adapted to be engaged by a pawl operated by a time-setting mechanism.

7. A focal-plane shutter for photographic cameras as claimed in claim 1, including guide means mounted adjacent said image-aperture plate for guiding said lamellae during movement, said guide means comprising two guide bars, one of said guide bars extending parallel to one edge of said aperture in said image-aperture plate, the other of said guide bars extending parallel to the opposite edge of said aperture in said image-aperture plate, one of said guide bars guiding the lamellae of said leading shutter blade, the other said guide bar guiding the lamellae of said lagging shutter blade.

8. A focal-plane shutter for photographic cameras as claimed in claim 1, including guide means mounted on the image-aperture plate for guiding said lamellae during movement, said guide means comprising first and second guide bars extending in parallel, said first guide bar located on said image-aperture plate and guiding the lamellae of said leading shutter blade, said second guide bar located on the opposite side of the aperture in said image-aperture plate and guiding the lamellae of said lagging shutter blade.

* * * * *